United States Patent
Arikere et al.

(10) Patent No.: US 11,794,747 B2
(45) Date of Patent: Oct. 24, 2023

(54) METHOD FOR CONTROLLING AN ACTUATOR OF A VEHICLE

(71) Applicant: Volvo Truck Corporation, Gothenburg (SE)

(72) Inventors: Adithya Arikere, Gothenburg (SE); Leo Laine, Härryda (SE); Ray Sidhant, Gothenburg (SE); Leon Henderson, Härryda (SE); Mattias Åsbogård, Mölnlycke (SE); Johan Lindberg, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 50 days.

(21) Appl. No.: 17/516,783

(22) Filed: Nov. 2, 2021

(65) Prior Publication Data

US 2022/0144280 A1    May 12, 2022

(30) Foreign Application Priority Data

Nov. 9, 2020 (EP) .................................. 20206437

(51) Int. Cl.
*B60W 40/105* (2012.01)
*B60W 30/18* (2012.01)
*B62D 15/02* (2006.01)

(52) U.S. Cl.
CPC .... *B60W 30/18172* (2013.01); *B60W 40/105* (2013.01); *B62D 15/021* (2013.01); *B60W 2520/28* (2013.01); *B60W 2520/40* (2013.01)

(58) Field of Classification Search
CPC ......... B60W 30/18172; B60W 40/105; B60W 2520/28; B60W 2520/40; B60W 50/00;

(Continued)

(56) References Cited

U.S. PATENT DOCUMENTS

| 2006/0243502 A1* | 11/2006 | Weber | B60W 20/10 180/65.24 |
| 2008/0039990 A1* | 2/2008 | Stevens | B62K 11/007 701/93 |

(Continued)

FOREIGN PATENT DOCUMENTS

| CN | 104228609 A | 12/2014 |
| CN | 107253451 A | 10/2017 |

(Continued)

OTHER PUBLICATIONS

Pacejka, H., "Tire and vehicle dynamics," 2012, Elsevier Ltd., 629 pages.

(Continued)

*Primary Examiner* — Jeff A Burke
*Assistant Examiner* — Kyle T Johnson
(74) *Attorney, Agent, or Firm* — Withrow & Terranova, PLLC

(57) ABSTRACT

The present disclosure relates to a method for controlling at least one actuator of a vehicle, the actuator being configured to apply a torque on at least one wheel of the vehicle, wherein the applied torque is determined by a control function associated with a control bandwidth, the method comprising configuring the control function to control the applied torque to reduce a difference between a first parameter value related to a current rotational speed of the wheel and a second parameter value related to target rotational speed of the wheel; obtaining data indicative of a current operating condition of the vehicle; setting the control bandwidth of the control function in dependence of the current operating condition of the vehicle; and controlling the actuator using the control function.

14 Claims, 5 Drawing Sheets

(58) Field of Classification Search
CPC . B60W 2050/0011; B60W 2050/0019; B60W 2050/0024; B60W 2050/0026; B60W 2520/26; B60W 2530/10; B60W 2552/40; B60W 2720/28; B60W 2720/30; B60W 10/08; B60W 10/184; B60W 2300/12; B60W 50/0098; B60W 2520/10; B60W 2520/30; B60W 2552/15; B62D 15/021; B60L 15/20; B60L 2240/12; B60L 2240/26; B60L 2240/461; B60L 2240/463; B60L 2240/642; B60Y 2200/91
See application file for complete search history.

(56) References Cited

U.S. PATENT DOCUMENTS

| | | | | |
|---|---|---|---|---|
| 2013/0110336 A1* | 5/2013 | Braier | ............... | B60W 10/08 180/65.265 |
| 2014/0058604 A1* | 2/2014 | Ito | ............... | B60W 10/06 180/65.265 |
| 2019/0100210 A1* | 4/2019 | Imamura | ............... | B60K 23/08 |
| 2019/0160966 A1* | 5/2019 | Jung | ............... | B60L 15/2036 |
| 2021/0197778 A1* | 7/2021 | Shi | ............... | B60T 8/1761 |
| 2022/0144280 A1* | 5/2022 | Arikere | ............... | B60W 40/105 |
| 2022/0161801 A1* | 5/2022 | Arikere | ............... | B60W 10/08 |
| 2022/0242252 A1* | 8/2022 | Wang | ............... | B60L 15/20 |

FOREIGN PATENT DOCUMENTS

| | | |
|---|---|---|
| CN | 110850905 A | 2/2020 |
| DE | 102019202769 A1 | 9/2020 |

OTHER PUBLICATIONS

Satzger, C. et al., "A Model Predictive Control Allocation Approach to Hybrid Braking of Electric Vehicles," 2014 IEEE Intelligent Vehicles Symposium (IV), Jun. 8-11, 2014, Dearborn, Michigan, USA, IEEE, pp. 286-292.

Savitski, D. et al., "Improvement of traction performance and off-road mobility for a vehicle with four individual electric motors: Driving over icy road," Journal of Terramechanics, vol. 69, Feb. 2017, Elsevier Ltd., pp. 33-43.

Extended European Search Report for European Patent Application No. 20206437.4, dated Apr. 30, 2021, 10 pages.

* cited by examiner

METHOD FOR CONTROLLING AN ACTUATOR OF A VEHICLE

RELATED APPLICATION

The present application claims priority to European Patent Application No. 20206437.4, filed on Nov. 9, 2020, and entitled "METHOD FOR CONTROLLING AN ACTUATOR OF A VEHICLE," which is incorporated herein by reference in its entirety.

TECHNICAL FIELD

The present disclosure relates to a method for controlling at least one actuator of a vehicle. The present disclosure also relates to a method performed in an actuator control system, a method performed in a vehicle motion management system, an actuator control system as well as a vehicle motion management system. Moreover, the present disclosure further relates to a control signal representing instructions to be executed by the actuator control system. The present disclosure is applicable to electrically propelled vehicles. Although the disclosure will mainly be directed to a vehicle in the form of a truck using electric machines for propulsion, it may also be applicable for other types of vehicles.

BACKGROUND

In the field of vehicles, in particularly low-, medium- and heavy-duty vehicles commonly referred to as trucks, there is a continuous development with regards to various control functionalities of the vehicle. In particular, the control functionalities intend to improve the drivability of the vehicle, the comfort for the driver, and the safety during operation.

CN 10 4228609 relates to a wheel speed control method. In particular, a module calculates an actual vehicle speed by using the speed of four wheels. Thereafter, the module calculates a difference value between the actual vehicle speed and the target vehicle speed and inputs the difference value into a controller. The controller outputs a target torque of a drive motor. Thereby, the driving torque is obtained by adaptive adjustment of the feedback type, and the accelerator pedal is not directly related to the motor torque, whereby the driver is not required to constantly adjust the accelerator pedal during driving.

Although CN 10 4228609 presents an effort to improve vehicle operation, it is still in need of further improvements, especially regarding operator comfortability. There is thus a desire to improve the comfort for a vehicle operator as well as reducing an overall energy consumption during operation.

SUMMARY

It is an object of the present disclosure to at least partially overcome the above described deficiencies. According to a first aspect, there is provided a method for controlling at least one actuator of a vehicle, the actuator being configured to apply a torque on at least one wheel of the vehicle, wherein the applied torque is determined by a control function associated with a control bandwidth, the method comprising configuring the control function to control the applied torque to reduce a difference between a first parameter value related to a current rotational speed of the wheel and a second parameter value related to target rotational speed of the wheel; obtaining data indicative of a current operating condition of the vehicle; setting the control bandwidth of the control function in dependence of the current operating condition of the vehicle; and controlling the actuator using the control function.

The control function should be construed as an operation functionality configured to apply a torque to the at least one actuator. By means of the control bandwidth, the torque can be applied with various response time depending on the current operating condition. According to an example, as will also be described below, a decreased bandwidth may be associated with an increased torque response time for the actuator. Thus, the torque is applied more rapidly with an increased bandwidth.

Moreover, the value related to a current rotational speed of the wheel as well as the value related to the target rotational speed of the wheel should be construed as values that could relate to both a rotational wheel speed as well as a wheel slip, i.e., a difference between the wheel speed over ground and the actual wheel speed. In the latter case, the first parameter may thus be a current wheel slip of the wheel, and the second parameter may be a target wheel slip of the wheel.

An advantage is that the bandwidth is controlled based on the current operating condition, which will result in a rapid torque response when required and a lower, more moderate torque response in other situations. Thus, the comfort during operation is improved and the overall energy consumption for the vehicle can be reduced as a rapid, energy consuming operation is only performed when required. Furthermore, the increased configurability allows for additional degrees of freedom when optimizing vehicle control in general.

Furthermore, the control function obtains parameters relating to the rotational speed of the wheel. A common approach for requesting a certain tyre force from a wheel is to use torque control at the actuator level based on torque requests sent from a higher layer control function. However, the latencies involved in the communication between the different control function, e.g., over a Controller Area Network (CAN) bus, significantly limits the slip control performance. Thus, a speed based control function is obtained which is advantageous in comparison to e.g. torque based control. In particular, for an electric machine, speed based control of wheel slip performed locally is more rapid compared to centrally managed torque control, primarily due to CAN message cycle time.

As will be described in further detail below, the method may preferably be executed using a vehicle motion management system and an actuator control system. The bandwidth may, when implementing such vehicle motion management system and actuator control system, be controlled in a number of different manners. For example, the vehicle motion management system can be arranged to transmit a control signal to the actuator control system, which signal comprises data relating to a target bandwidth, as well as a vehicle operating condition. The target bandwidth is thus set/determined by the vehicle motion management system. Based on the target bandwidth, the actuator control system determines, based on various parameters, a control bandwidth to achieve the target bandwidth.

According to another example, the vehicle motion management system is configured to determine the control bandwidth itself based on the current operating condition, and transmits the control signal indicative of the determined control bandwidth to the actuator control system. The actuator control system thereafter controls the actuator using the control bandwidth received from the vehicle motion management system.

According to a still further example, the actuator control system may be provided with a plurality of predetermined bandwidth setting parameters. The vehicle motion management system is here configured to determine which bandwidth parameter setting being the most suitable based on the current operating condition, and transmits a control signal to the actuator control system to use the determined bandwidth setting parameter when controlling the actuator.

Further details of the control function and control bandwidth will be described below with regards to the other aspects of the present disclosure.

According to a second aspect, there is provided a method performed in an actuator control system for controlling at least one actuator to apply a torque on at least one wheel of a vehicle, the actuator control system comprising a control function, wherein the applied torque being determined by the control function in association with a control bandwidth, the method comprising determining a first parameter value related to a current rotational speed of the wheel; configuring the control function to control the applied torque to reduce a difference between the first parameter value and a second parameter value related to a target rotational speed of the wheel; obtaining data indicative of a current operating condition of the vehicle; setting the control bandwidth of the control function in dependence of the current operating condition of the vehicle; and controlling the actuator using the control function.

The data indicative of the current operating condition may preferably be obtained from the above described higher level vehicle motion management system by receiving a control signal therefrom.

According to an example embodiment, the control function may be configured to control a speed of the actuator.

As described above, speed control of the actuator is particularly advantageous when propelling the vehicle using electric machines since the speed based control is more rapid compared to torque control. The speed based control is also more accurate in terms of controlling slip and more robust to external disturbances, such as change in friction between the wheel surface and the road surface, potholes, etc., compared to a torque based control.

According to an example embodiment, an increased bandwidth of the control function may be associated with an increased torque response for the actuator. By increased torque response should be construed such that the torque response time is decreased.

According to an example embodiment, the control bandwidth of the control function may be controlled using a predetermined set of feedback gains for the actuator, each feedback gain is associated with a specific operating condition of the vehicle. The feedback gain should be construed as a parameter representing the characteristics of actuator response. Thus, the "aggressiveness" of the torque response is based on a predetermined set of gains, where a larger feedback gain value generates a more rapid torque response, i.e., a higher bandwidth control behavior. For example, a large gain is preferably provided for an operating condition requiring a rapid torque response.

According to an example embodiment, the control function may be a PID-controller.

A PID-controller, also referred to as a proportional-integral-derivative controller, is particularly useful for controlling the actuator using the feedback gains. The PID controller can advantageously calculate an error value as the difference between the first and second parameter values and apply a rapid correction. As an example, when the current operating condition requires a rapid response, the proportionality and integer terms of the PID controlled is increased compared to a current operating condition requiring a more moderate torque response.

According to an example embodiment, the control function may be a proportionality controller, the method further comprising obtaining a signal indicative of a target bandwidth for the control function; and configuring the control function using the target bandwidth and a proportionality parameter relating to the current operating condition of the vehicle.

By means of proportionality controller should be understood that the control function merely controls the actuator by a proportion value of the target bandwidth. The proportion value is thus preferably a proportion parameter of the difference between the first parameter value related to the current rotational speed and the second parameter value related to the target rotational speed.

Further effects and features of the second aspect are largely analogous to those described above in relation to the first aspect.

According to a third aspect, there is provided a method performed in a vehicle motion management system of a vehicle, the vehicle motion management system being connectable to an actuator control system for communication of control signals therebetween, the method comprising obtaining a current speed of the vehicle; determining a current operating condition of the vehicle; and transmitting a control signal to the actuator control system, the control signal representing instructions which, when executed by the actuator control system, cause a control function of the actuator control system to apply a torque on at least one wheel of the vehicle for reducing a difference between a first parameter value related to a current rotational speed of the wheel based on the current speed of the vehicle and a second parameter value related to a target rotational speed of the wheel, in association with a control bandwidth, the control bandwidth being determinable in dependence of the current operating condition of the vehicle.

The current speed of the vehicle can be the current wheel speed of the vehicle wheel, or merely the speed of the vehicle. The vehicle speed may preferably be obtained from a speed sensor, or equivalent, as well as from an advanced driver assistance system (ADAS). The vehicle motion management system thus transmits higher layer vehicle parameters to the actuator control system which, based on the control signal received from the vehicle motion management system, determines wheel specific parameters. For example, the vehicle motion management system transmits a signal comprising data indicative of the speed of the vehicle, but the actuator control system converts this vehicle speed to a parameter value related to the rotational speed of the wheel. The actuator control system may preferably incorporate a current driveline state when determining the rotational speed of the wheel. Such driveline state is preferably a current gear, an engagement/disengagement property of one or more clutches, etc.

The vehicle motion management system thus generates a control signal which enables the actuator control system to properly control the actuator as described above in relation to the second aspect.

According to an example embodiment, the method may further comprise determining a target speed of the vehicle based on the current operating condition, wherein the target rotational speed of the wheel is based on the target speed of the vehicle. Accordingly, the target speed is hereby determined by the higher layer vehicle motion management system.

According to an example embodiment, the method may further comprise determining, based on the current operating condition, a desired operation performance of the vehicle, wherein the control bandwidth being further determinable in dependence of the desired operation performance of the vehicle.

The desired operation performance may, for example, relate to a preferred driving experience and/or driving comfort for the operator.

According to an example embodiment, the method may further comprise determining a target bandwidth; and transmitting the control signal comprising the determined target bandwidth, wherein the control bandwidth being further determinable in dependence of the target bandwidth. Thus, the control signal is indicative of the determined target bandwidth. Hence, the control signal provided to the actuator control system may preferably be indicative of a target bandwidth that will be obtained by the actuator control system as the control bandwidth when configuring the control function preferably using the proportionality parameter described above.

According to an example embodiment, the current operating condition of the vehicle may be based on at least one of a current vehicle condition and a current road condition at which the vehicle is operating. Thus, the current operating condition can be obtained from vehicle specific parameters, such as e.g. laden or unladen vehicle, and/or based on the road condition, such as e.g. grippy or slippery road conditions, etc.

According to an example embodiment, the current operating condition may be at least one of a current vehicle mass, an inclination of the road at which the vehicle is operating, vehicle speed, a friction level between the wheel of the vehicle and a road surface, and a current tire stiffness.

These operating conditions can be determined based on e.g. sensor signal data, or by computational calculations based on sensor data input, etc. An advantage is that the control bandwidth can be operated based on several parameters and factors of the vehicle and its environment.

According to a fourth aspect, there is provided an actuator control system of a vehicle, the actuator control system being configured to control at least actuator to apply a torque on at least one wheel of a vehicle, the actuator control system comprising a control function, wherein the applied torque being determined by the control function in association with a control bandwidth, the actuator control system being configured to determine a first parameter value related to a current rotational speed of the wheel; configure the control function to control the applied torque to reduce a difference between the first parameter value and a second parameter value related to a target rotational speed of the wheel; obtain data indicative of a current operating condition of the vehicle; set the control bandwidth of the control function in dependence of the current operating condition of the vehicle; and control the actuator using the control function.

Effects and features of the fourth aspect are largely analogous to those described above in relation to the first, second and third aspects, in particular the second aspect.

According to a fifth aspect, there is provided a vehicle motion management system of a vehicle, the vehicle motion management system being connectable to an actuator control system for communication of control signals therebetween, wherein the vehicle motion management system is configured to obtain a current speed of the vehicle; determine a current operating condition of the vehicle; and transmit a control signal to the actuator control system, the control signal representing instructions which, when executed by the actuator control system, cause a control function of the actuator control system to apply a torque on at least one wheel of the vehicle for reducing a difference between a first parameter value related to a current rotational speed of the wheel based on the current speed of the vehicle and a second parameter value related to a target rotational speed of the wheel, in association with a control bandwidth, the control bandwidth being determined in dependence of the current operating condition of the vehicle.

Effects and features of the fifth aspect are largely analogous to those described above in relation to the first, second and third aspects, in particular the third aspect.

According to a sixth aspect, there is provided a control signal representing instructions to be executed by an actuator control system of a vehicle, the control signal comprising a vehicle speed component enabling the actuator control system to determine a current rotational speed of the wheel; and a vehicle operating condition component representing instructions which, when executed by the actuator control system, cause a control function of the actuator control system to apply a torque on at least one wheel of the vehicle for reducing a difference between a first parameter value related to a current rotational speed of the wheel based on the current speed of the vehicle and a second parameter value related to a target rotational speed of the wheel, in association with a control bandwidth, the control bandwidth being determinable in dependence of the current operating condition of the vehicle.

The vehicle speed component may comprise data indicative of a target vehicle speed enabling the actuator control system to determine a target rotational speed of the actuator.

According to a seventh aspect, there is provided a computer program comprising program code means for performing the steps of any one of the embodiments described above in relation to the first, second and third aspects when the program is run on a computer.

According to an eight aspect, there is provided a computer readable medium carrying a computer program comprising program means for performing the steps of any one of the embodiments described above in relation to the first, second and third aspects when the program means is run on a computer.

Effects and features of the sixth, seventh and eight aspects are largely analogous to those described above in relating to the remaining aspects of the present disclosure.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
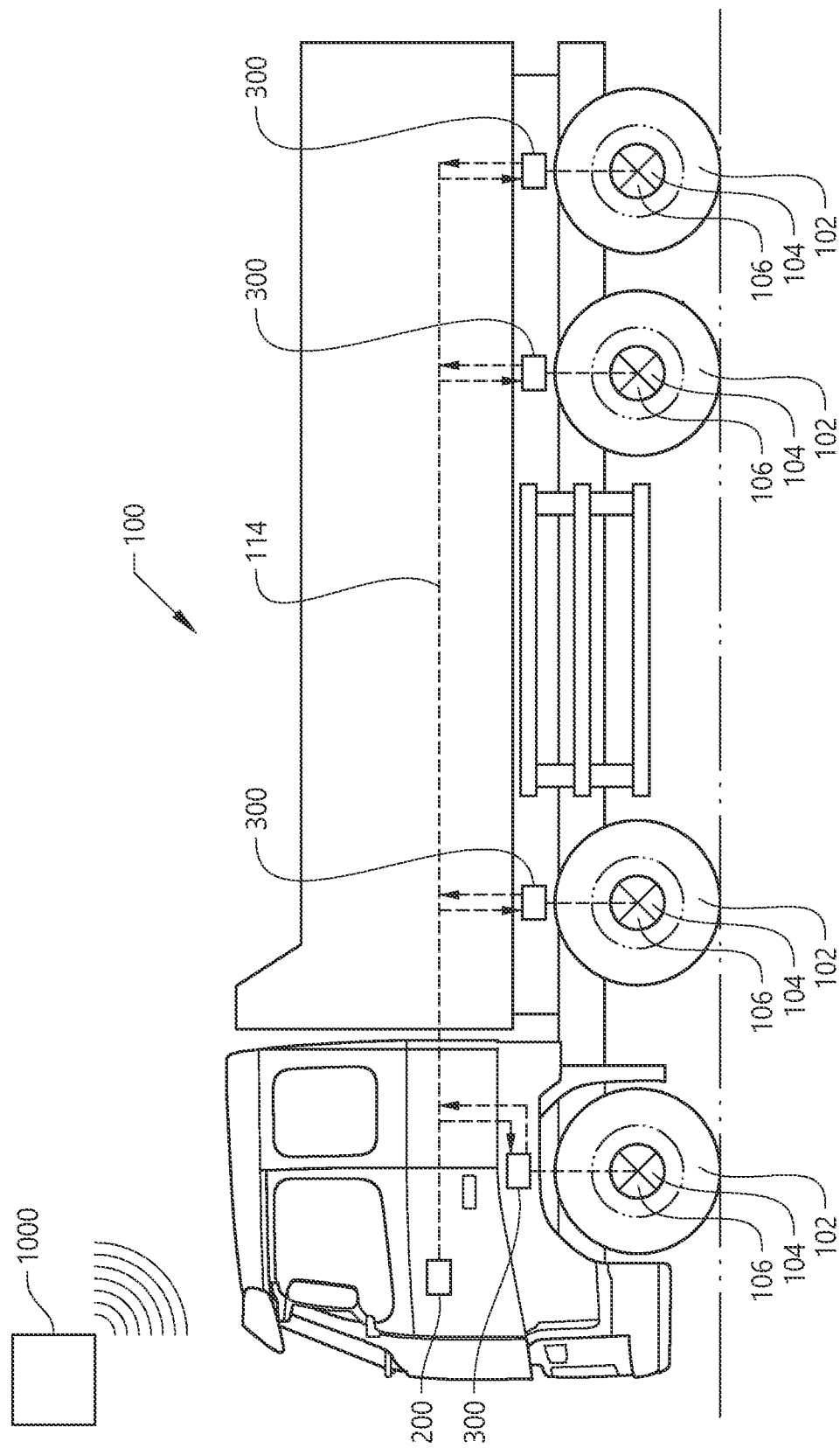
FIG. 1 is a lateral side view illustrating an example embodiment of a vehicle in the form of a truck.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

Figure 3:
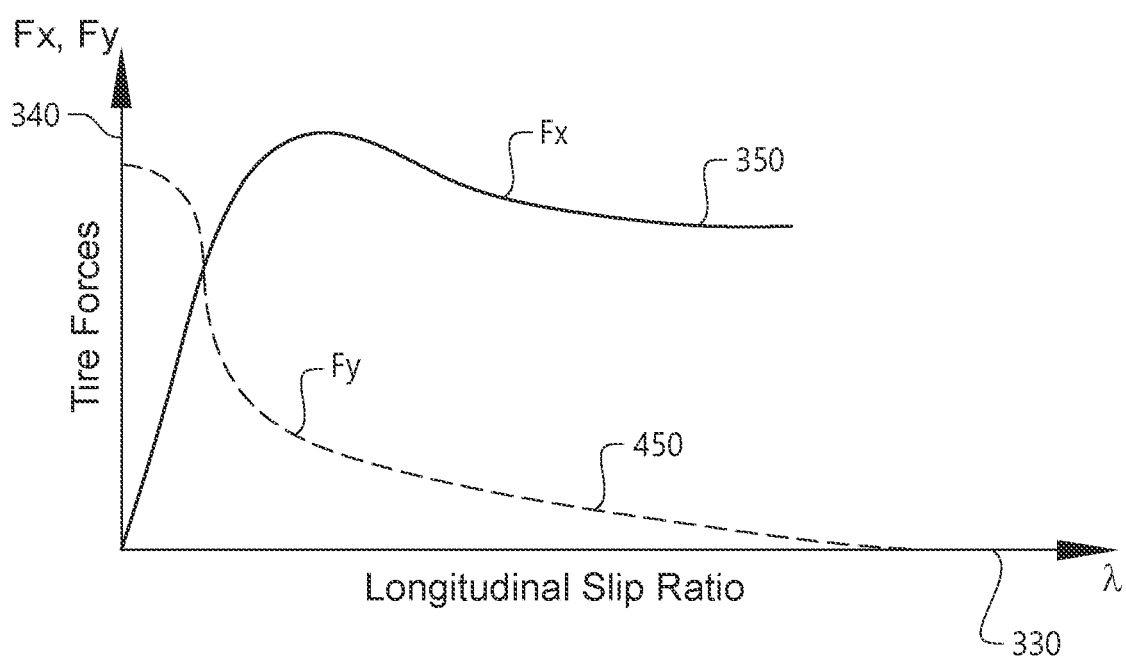
FIG. 3 is a graph illustrating an example embodiment of a model representing a relationship between wheel slip and tire forces.

With particular reference to FIG. 1, there is depicted a vehicle 100 in the form of a truck. The vehicle comprises a plurality of wheels 102, wherein each of the wheels 102 comprises a respective actuator 104. Although the embodiment depicted in FIG. 1 illustrates an actuator for each of the wheels 102, it should be readily understood that e.g. one pair of wheels 102 may be arranged without such an actuator 104. Further, the actuators 104 are preferably actuators for generating a torque on a respective wheel of the vehicle or for both wheels of an axle. The actuator may be an electric machine 106 arranged to e.g. provide a longitudinal wheel force to the wheel(s) of the vehicle 100, as depicted in FIG. 3 and described further below. Such an electric machine may thus be adapted to generate a propulsion torque as well as to be arranged in a regenerative braking mode for electrically charging a battery (not shown) or other energy storage system(s) of the vehicle 100. Electric machines may also generate braking torque without storing energy. For instance, brake resistors and the like may be used to dissipate the excess energy from the electric machines during braking.

Moreover, each of the actuators 104 is connected to a respective actuator control system 300 arranged for controlling operation of the actuator 104. The actuator control system 300 is preferably a decentralized actuator control system 300, although centralized implementations are also possible. It is furthermore appreciated that some parts of the motion support system may be implemented on processing circuitry remote from the vehicle, such as on a remote server 1000 accessible from the vehicle via wireless link. Still further, each actuator control system 300 is connected to a vehicle motion management system 200 of the vehicle 100 via a data bus communication arrangement 114 that can be either wired, wireless or both wired and wireless. Hereby, control signals can be transmitted between the vehicle motion management system 200 and the actuator control system 300. The vehicle motion management system 200 and the actuator control system 300 will be described in further detail below with reference to FIG. 2.

The vehicle motion management system 200 as well as the actuator control system 300 may include a microprocessor, microcontroller, programmable digital signal processor or another programmable device. The systems may also, or instead, include an application specific integrated circuit, a programmable gate array or programmable array logic, a programmable logic device, or a digital signal processor. Where the system(s) include(s) a programmable device such as the microprocessor, microcontroller or programmable digital signal processor mentioned above, the processor may further include computer executable code that controls operation of the programmable device.

Figure 2:
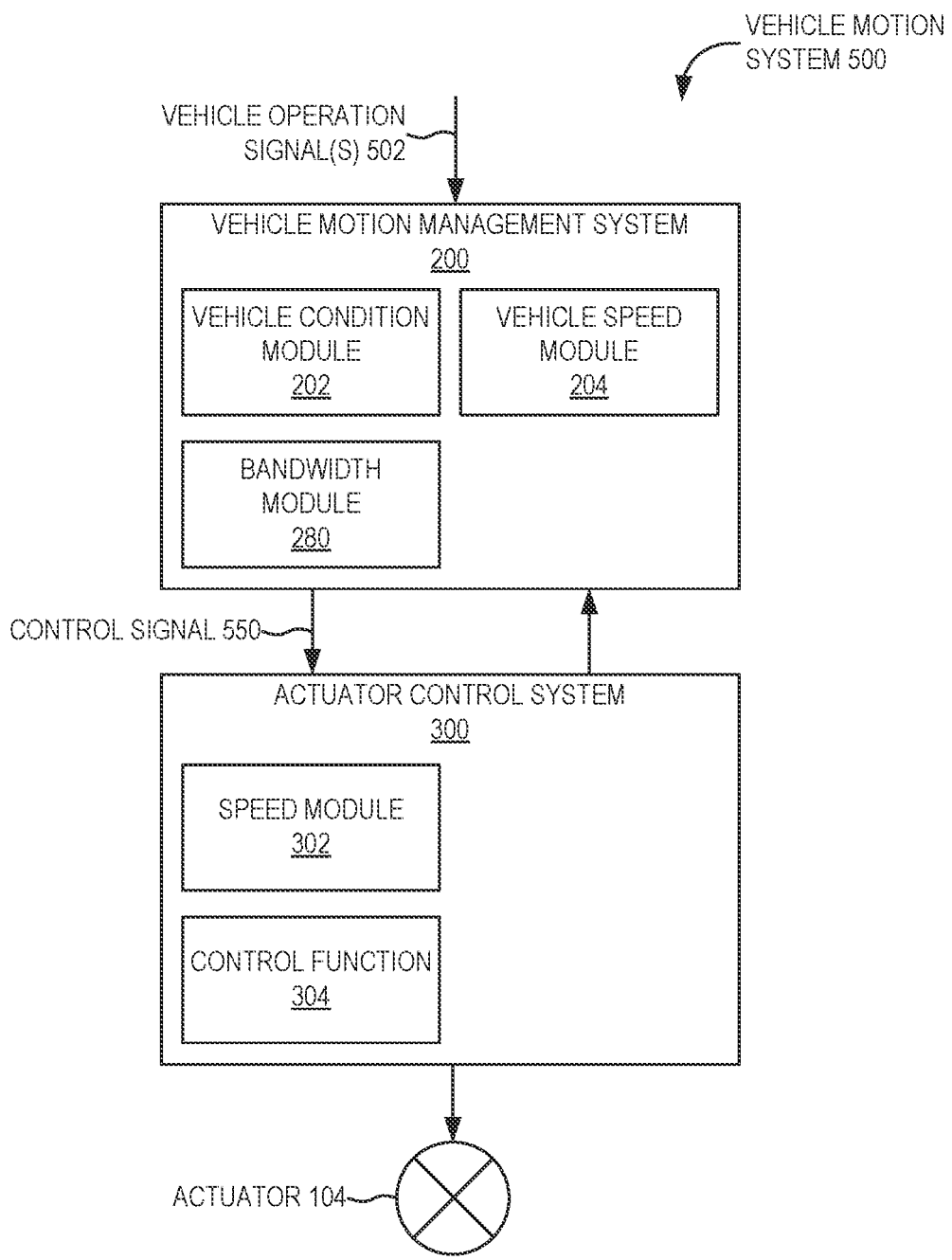
FIG. 2 is a schematic illustration of a vehicle motion management system and an actuator control system according to an example embodiment.

Turning to FIG. 2 which is a schematic illustration of the vehicle motion management system 200 and the actuator control system 300 according to an example embodiment. The vehicle motion management system 200 and the actuator control system 300 thus form part of a vehicle motion system 500. The overall vehicle control system may be implemented on one or more vehicle unit computers (VUC). The VUC may be configured to execute vehicle control methods which are organized according to a layered functional architecture where some functionality may be comprised in a traffic situation management (TSM) domain in a higher layer and some other functionality may be comprised in a vehicle motion management (VMM) domain residing in a lower functional layer.

FIG. 2 schematically illustrates functionality for controlling one or more wheels by some example actuator control systems (MSDs), such as a friction brake and a propulsion device. The friction brake and the propulsion device are examples of wheel torque generating devices, which may also be referred to as actuators and which can be controlled by one or more actuator control systems. The control is based on, e.g., measurement data obtained from a wheel speed sensor and from other vehicle state sensors, such as radar sensors, lidar sensors, and vision based sensors such as camera sensors and infra-red detectors. Other example torque generating actuator control systems which may be controlled according to the principles discussed herein comprise engine retarders and power steering devices.

An MSD control unit may be arranged to control one or more actuators. For instance, it is not uncommon that an MSD control unit is arranged to control both wheels on a given axle, e.g., via a differential.

The TSM function plans driving operation with a time horizon of, e.g., 10 seconds or so. This time frame corresponds to, e.g., the time it takes for the vehicle to negotiate a curve. The vehicle maneuvers, planned and executed by the TSM, can be associated with acceleration profiles and curvature profiles which describe a desired vehicle velocity and turning for a given maneuver. The TSM continuously requests the desired acceleration profiles $a_{req}$ and curvature profiles $c_{req}$ from the VMM function which performs force allocation to meet the requests from the TSM in a safe and robust manner.

Acceleration profiles and curvature profiles may also be obtained from a driver of the heavy duty vehicle via normal control input devices such as a steering wheel, accelerator pedal and brake pedal.

The VMM function operates with a time horizon of about 1 second or so, and continuously transforms the acceleration profiles $a_{req}$ and curvature profiles $c_{req}$ into control commands for controlling vehicle motion functions, actuated by the different MSDs of the vehicle 100 which report back capabilities to the VMM, which in turn are used as constraints in the vehicle control. The VMM function performs vehicle state or motion estimation, i.e., the VMM function continuously determines a vehicle state comprising positions, speeds, accelerations and articulation angles of the different units in the vehicle combination by monitoring operations using various sensors arranged on the vehicle 100, often but not always in connection to the MSDs.

The result of the motion estimation, i.e., the estimated vehicle state(s), may be input to a force generation module which determines the required global forces for the different vehicle units to cause the vehicle 100 to move according to the requested acceleration and curvature profiles $a_{req}$, $c_{req}$. The required global force vector is input to an MSD coordination function which allocates wheel forces and coordinates other MSDs such as steering and suspension. The coordinated MSDs then together provide the desired lateral $F_y$ and longitudinal $F_x$ forces on the vehicle units, as well as the required moments $M_z$, to obtain the desired motion by the vehicle combination.

By determining vehicle unit motion using, e.g., global positioning systems, vision-based sensors, wheel speed sensors, radar sensors and/or lidar sensors, and translating this vehicle unit motion into a local coordinate system of a given wheel (in terms of, e.g., longitudinal and lateral velocity components), it becomes possible to accurately estimate wheel slip by comparing the vehicle unit motion in the wheel reference coordinate system to data obtained from the wheel speed sensor arranged in connection to the wheel.

A tire model, which will be discussed in more detail in connection to FIG. 3 below, can be used to translate between a desired longitudinal tire force $F_x$ and wheel slip. Wheel slip relates to a difference between wheel rotational velocity and speed over ground. Wheel speed is a rotational speed of the wheel, given in units of, e.g., rotations per minute (rpm) or angular velocity in terms radians/second (rad/s) or degrees/second (deg/s).

Herein, a tire model is a model of wheel behavior which describes wheel force generated in longitudinal direction (in the rolling direction) and/or lateral direction (orthogonal to the longitudinal direction) as function of wheel slip. In "Tire and vehicle dynamics", Elsevier Ltd. 2012, ISBN 978-0-08-097016-5, Hans Pacejka covers the fundamentals of tire models. See, e.g., chapter 7 where the relationship between wheel slip and longitudinal force is discussed.

To summarize, the VMM function manages both force generation and MSD coordination, i.e., it determines what forces that are required at the vehicle units in order to fulfil the requests from the TSM function, for instance to accelerate the vehicle according to a requested acceleration profile requested by TSM and/or to generate a certain curvature motion by the vehicle also requested by TSM. The forces may comprise e.g., yaw moments $M_z$, longitudinal forces $F_x$ and lateral forces $F_y$, as well as different types of torques to be applied at different wheels.

The VMM is arranged as a higher layer control system, while the MSD is arranged as a lower layer control system. The higher layer VMM 200 is thus arranged to determine various parameters, as will be described below, in the vehicle/wheel domain, i.e. based on an overall vehicle condition, such as vehicle speed. The lower layer MSD 300 on the other hand is arranged to determine parameters which are specific for the actuator connected to the wheel. The lower layer MSD thus transform the signals received from the higher layer VMM into the actuator domain taking into account e.g. gear ratio, driveline inertia, etc.

Accordingly, and as will also be described below, the vehicle motion management system and the actuator control system are control systems of the vehicle, where each of the control systems are arranged to execute various control functionalities for controlling operation of the vehicle, in particular for controlling wheel operations. The vehicle motion management system is, as described above, configured to receive, and determine wheel parameters in a higher layer, i.e. the vehicle motion management system determines, for example, a desired speed and in a more generalized form, whereas the actuator control system is configured to convert the parameters received from the vehicle motion management system to appropriate parameters for an actuator.

According to a non-limiting example, the vehicle motion management system 200 comprises vehicle condition module 202, a vehicle speed module 204 and optionally a bandwidth module 280. The vehicle motion management system 200 is further arranged to receive vehicle operation signal(s) 502 which comprises data to be operated on the vehicle motion management system 200 and its various modules 202, 204, 280. The vehicle operation signal(s) 502 provided to the vehicle motion management system 200 may, for example, comprise data in the form of signal(s) indicative of a current environment of the vehicle, a current traffic situation, vehicle weight parameter, such as e.g. if the vehicle is laden, unladen, partially laden, etc. The vehicle motion management system 200 may also receive other signals indicative of specific vehicle conditions, such as e.g. a current vehicle operating condition as will be described below. The modules, which could be formed by further number of modules than what is depicted in FIG. 2, are configured to transmit communication signals between one another, i.e. the different modules are configured to communicate with each other as will be evident by the following disclosure. It should be readily understood that the vehicle condition module 202, the vehicle speed module 204 and the bandwidth module 280 are illustrated as separate components merely for illustrative purposes. The vehicle motion management system 200 may of course also simply comprise various control functionalities itself, which control functionalities execute the below described operations.

The following will now describe the functional operation of the vehicle motion management system 200. In particular, the vehicle motion management system 200 is arranged to receive an input signal 502 with information relating to a current speed of the vehicle. Furthermore, the vehicle condition module 202 may be arranged to determine a current operating condition of the vehicle 100. The current operating condition may, for example, comprise data indicative of a wheel friction level between the wheel of the vehicle and the road surface, the current weight of the vehicle, i.e. if the vehicle is unladen, laden or partially laden, and/or the topology of the road at which the vehicle is presently operating, etc. Hence, the current operating condition of the vehicle is based on at least one of a current vehicle condition and a current road condition at which the vehicle is operating. The various operating conditions may thus be determined by the vehicle motion management system 200 as individual conditions, or as a single condition by merging the different operating conditions as an overall vehicle operating condition. The current operating condition for the vehicle can be determined by receiving data from suitable sensor(s), which data is transmitted to the vehicle motion management system 200. Furthermore, the bandwidth module 280 is in the example embodiment configured to determine a bandwidth to be transmitted to the actuator control system 300.

The vehicle motion management system 200 is further configured to transmit a control signal 550 to the actuator control system 300. The control signal 550 comprises data indicative of the current operating condition of the vehicle 100 and the current speed of the vehicle. The control signal 550 preferably also comprises data indicative of control bandwidth, which control bandwidth is described in further detail below.

The actuator control system 300 preferably comprises a wheel speed module 302 and a control function 304. The wheel speed module 302 is arranged to determine a first parameter value related to a current rotational speed of the wheel 102. The first parameter can be either the rotational wheel speed of the wheel 102 or the current wheel slip of the wheel 102. The first parameter value related to the current rotational speed of the wheel 102 is based on the current vehicle speed received from the vehicle motion management system 200. The speed module 302 thus converts the higher level vehicle speed value into a parameter expressed in a wheel specific coordinate system (not illustrated).

With regards to wheel slip, the characteristics of the wheel slip relative to longitudinal tire forces are depicted in FIG. 3. Thus, FIG. 3 illustrates a tire model 350 representing the relationship between the calculated longitudinal wheel slip and the estimated longitudinal wheel force values. The tire model 450 optionally also represents the relationship between maximum obtainable lateral wheel forces for a given longitudinal wheel slip. The model 450 can also, for a predetermined lateral slip angle of the tire, represent the achieved lateral wheel force for a given longitudinal wheel slip. The vertical axis 340 represents the tire force generated between the surface supporting the wheel 102 and the wheel, while the horizontal axis 330 represents the longitudinal wheel slip of the wheel 102.

Turning back to FIG. 2, the actuator control system 300 is also configured to determine a target rotational speed of the wheel 102. The target rotational speed of the wheel may be determined based on data from the control signal 550, whereby the control signal 550 comprises data relating to a desired vehicle speed. The actuator control system 300 is arranged to convert such vehicle speed into a parameter expressed in the wheel specific coordinate system.

Moreover, the actuator control system 300 is arranged to determine a torque to be applied to the actuator 104. In particular, the actuator control system 300 is arranged to configure the control function 304 to control an applied torque by the actuator 104 to reduce a difference between the current rotational speed and the target rotational speed. The actuator control system 300 is further configured to use the control bandwidth by means of the control function, which control bandwidth was received from the vehicle motion management system. The actuator control system 300 may also be configured to set the control bandwidth to the control function 304 based on the current operating condition received from the vehicle motion management system 200. The actuator 104 is thereby controlled to apply the torque using the control function. The control function is preferably configured to control the speed of the actuator.

Accordingly, the torque is applied by the actuator using different control bandwidths in dependence of the current operating condition of the vehicle 100. The torque can thus be applied rapidly, when the current operating condition so requires, or be applied in a more moderate manner when the current operating condition is not in need of such rapid torque response. Furthermore, the vehicle control system now has more freedom to perform the vehicle motion control since it now has the option to not only set a desired target value for the control, but also a control bandwidth with which the control is to be performed. A large control bandwidth normally implies a more rapid response to changes such as varying road incline, friction, and so on. A smaller bandwidth implies a slower response to changes in operating condition, but on the other hand more noise is suppressed due to the smaller bandwidth.

According to an example embodiment, the control bandwidth of the control function is controlled using a predetermined set of feedback gains for the actuator, where the control function is preferably a PID-controller.

Furthermore, the control function may optionally comprise a feedforward component. The feedforward component can be used as input data for e.g. the choice of feedback gains for the controller.

According to a non-limiting example, the below equations (1)-(4) can be used when calculating an estimated required torque for the actuator, wherein the estimated required torque is preferably used to set the P, I and/or D gains of the PID-controller.

$$\lambda_{req,i} = \frac{\omega_{req} R_i i_g i_{fd} - v_x}{\max(|v_x|, |\omega_{req} R_i i_g i_{fd}|)} \quad (1)$$

$$C_i = F_{z,i}\left(c_0 + \frac{c_1 F_{z,i}}{2}\right) \quad (2)$$

$$\alpha_i = \frac{v_{y,est} + \gamma l_i}{v_x + \gamma w_i} \quad (3)$$

$$T_{axle,ff} = (R_l f_{tyre}(\lambda_{req}, C_l, \alpha_l, \mu_{est}) + R_r f_{tyre}(\lambda_{req}, C_r, \alpha_r, \mu_{est})) i_g i_{fd} \quad (4)$$

Where $\lambda_{req,i}$, $\alpha_i$ are the required longitudinal wheel slip calculated from a target wheel speed, and the current estimated wheel lateral slip, $\omega_{req}$, $R_i$ are the target wheel speed and wheel radius, $i_g$, $i_{fd}$ are the gear and the final drive ratios of a vehicle transmission, respectively, $v_x$, $v_y$, $\gamma$ are vehicle longitudinal, lateral and yaw velocities, respectively, $C_i$, $F_{z,i}$, $c_0$, $c_1$ are the tire stiffness, normal load on the wheel, and linear and non-linear tyre stiffness normal load dependence parameters, $T_{axle,ff}$ is a calculated estimated required torque for the actuator, and $f_{tyre}$ is the tire model function of which an example is shown in FIG. 3.

Figure 4:
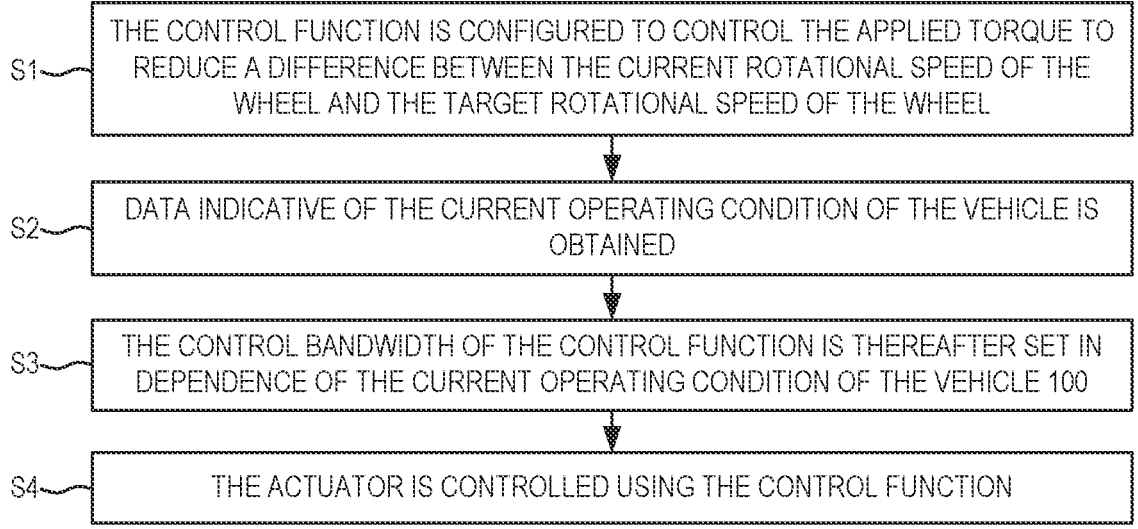
FIG. 4 is a flow chart of a method for controlling an actuator of the vehicle in FIG. 1 according to an example embodiment.

Reference is now made to FIG. 4, which is a flow chart of a method for controlling an actuator of the vehicle in FIG. 1 according to an example embodiment. The various operations executed by the method described in relation to FIG. 4 is not limited to be executed by a specific one of the vehicle motion management system 200 or actuator control system 300, but serves as an overall description of the functional operation of the present disclosure.

The method is configured to control the actuator 104 depicted in FIG. 1. The actuator is, as described above, configured to apply a torque on the wheel it is connected to. The applied torque is determined by the control function associated with a control bandwidth. The control function of the method in FIG. 4 can thus form part of either the vehicle motion management system 200 or the actuator control system 300. The control function is configured S1 to control the applied torque to reduce a difference between the current rotational speed of the wheel and the target rotational speed of the wheel as described in further detail above.

Moreover, data indicative of the current operating condition of the vehicle is also obtained S2. The control bandwidth of the control function is thereafter set S3 in dependence of the current operating condition of the vehicle 100, whereby the actuator is controlled S4 using the control function.

The above described vehicle motion management system 200 and actuator control system 300 are also, according to example embodiments, arranged to perform operational methods. The operations of the vehicle motion management system 200 and actuator control system 300 have been described above and to sum up, reference is now made to FIGS. 5 and 6.

Figure 5:
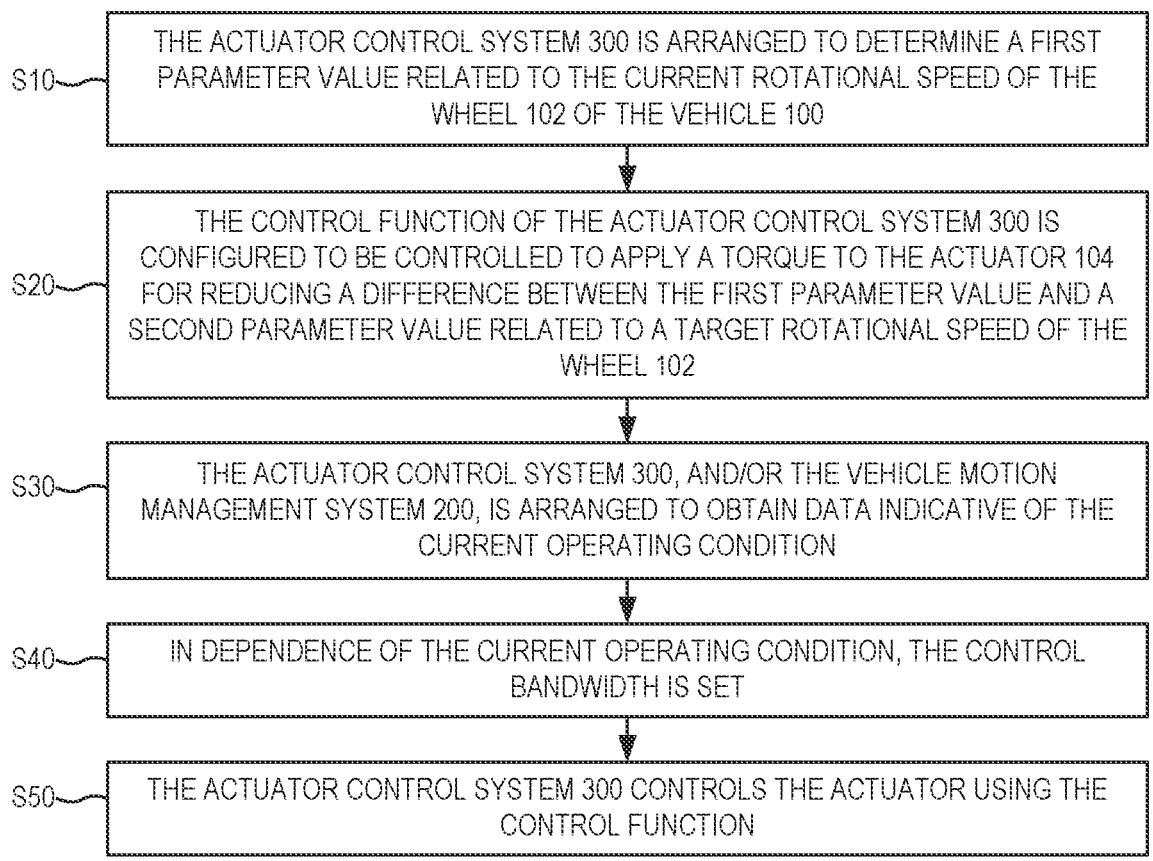
FIG. 5 is a flow chart of a method performed in the actuator control system of FIG. 2 according to an example embodiment.

Starting with FIG. 5, which is a flow chart of a method performed in the actuator control system of FIG. 2 according to an example embodiment. As described above in relation to FIG. 2, the actuator control system 300 comprises a control function associated with a control bandwidth. The actuator control system 300 is arranged to determine S10 a first parameter value related to the current rotational speed of the wheel 102 of the vehicle 100. As described above, the first parameter value may be either the rotational speed of the wheel or the current wheel slip of the wheel. The control function of the actuator control system 300 is thereafter configured S20 to be controlled to apply a torque to the actuator 104 for reducing a difference between the first parameter value and a second parameter value related to a target rotational speed of the wheel 102.

Furthermore, the actuator control system 300, and/or the vehicle motion management system 200, is arranged to obtain S30 data indicative of the current operating condition. The current operating condition can thus be received by the actuator control system 300 from the vehicle motion management system 200, or be transmitted by the vehicle operation signal(s) 502 to the vehicle motion management system 200. In dependence of the current operating condition, the control bandwidth is set 40, whereby the actuator control system 300 controls S50 the actuator using the control function.

Figure 6:
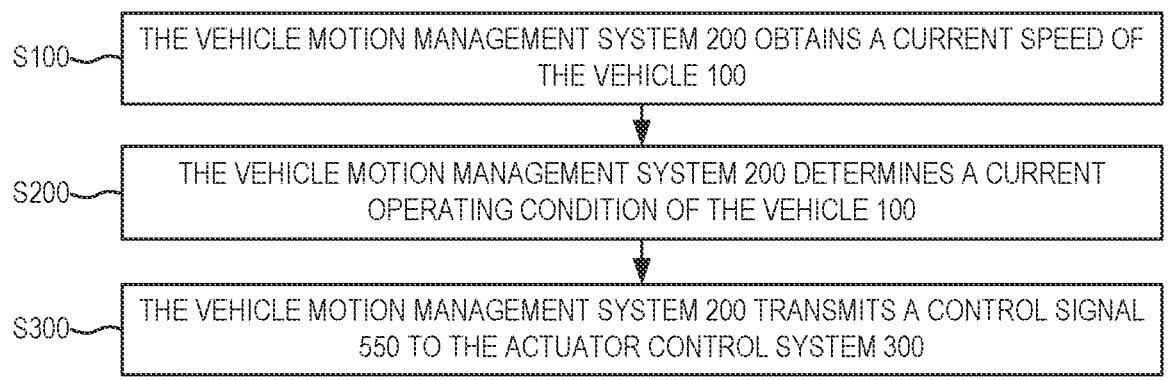
FIG. 6 is a flow chart of a method performed in vehicle motion management system of FIG. 2 according to an example embodiment.

Finally, reference is made to FIG. 6, which is a flow chart of a method performed in vehicle motion management system of FIG. 2 according to an example embodiment. As indicated above, the vehicle motion management system 200 obtains S100 a current speed of the vehicle 100. The current speed of the vehicle 100 can be obtained by receiving a signal from e.g. a speed sensor, or similar device, of the vehicle 100. The vehicle motion management system 200 further determines S200 a current operating condition of the vehicle 100 and transmits S300 a control signal 550 to the actuator control system 300.

The transmitted control signal 550 from the vehicle motion management system to the actuator control system 300 represents instructions which, when executed by the actuator control system 300, cause the control function 304 of the actuator control system to apply a torque on at least one wheel of the vehicle for reducing a difference between a first parameter value related to a current rotational speed of the wheel based on the current speed of the vehicle and a second parameter value related to a target rotational speed of the wheel, in association with a control bandwidth, the control bandwidth being determinable in dependence of the current operating condition of the vehicle.

The above described target rotational speed of the wheel 102 can be based on a target vehicle speed determined by the vehicle motion management system 200. Also, the vehicle motion management system 200 may be arranged to determine a desired operation performance, such as e.g. a preferred driving experience and/or driving comfort for the operator. The vehicle motion management system 200 can hereby transmit the desired operation performance as an input parameter for the actuator control system when setting the control bandwidth.

The methods described in relation to FIGS. 5 and 6 are thus arranged to operate in conjunction with each other.

It is to be understood that the present disclosure is not limited to the embodiments described above and illustrated in the drawings; rather, the skilled person will recognize that many changes and modifications may be made within the scope of the appended claims.

The invention claimed is:

1. A method for controlling at least one actuator of a vehicle, comprising:
   configuring, by an actuator control, a control function associated with a control bandwidth to control a torque applied to at least one wheel of a vehicle by an actuator to reduce a difference between a first parameter value related to a current rotational speed of the at least one wheel and a second parameter value related to a target rotational speed of the at least one wheel;
   obtaining, by the actuator control, data indicative of a current operating condition of the vehicle;
   setting, by the actuator control, the control bandwidth of the control function in dependence of the current operating condition of the vehicle; and
   controlling, by the actuator control, the actuator using the control function.

2. The method of claim 1, further comprising determining a first parameter value related to a current rotational speed of the wheel.

3. The method of claim 2, wherein the control function is configured to control a speed of the actuator.

4. The method of claim 2, wherein an increased bandwidth of the control function is associated with an increased torque response for the actuator.

5. The method of claim 2, wherein the control bandwidth of the control function is controlled using a predetermined set of feedback gains for the actuator, each feedback gain associated with a specific operating condition of the vehicle.

6. The method of claim 5, wherein the control function is a PID-controller.

7. The method of claim 2, wherein the control function is a proportionality controller, the method further comprising:
   obtaining a signal indicative of a target bandwidth for the control function; and
   configuring the control function using the target bandwidth and a proportionality parameter relating to the current operating condition of the vehicle.

8. A method, comprising:
   obtaining, by a vehicle motion management system of a vehicle, current speed of the vehicle;
   determining, by the vehicle motion management system, a current operating condition of the vehicle;
   transmitting, by the vehicle motion management system, a control signal to an actuator control system, the control signal representing instructions which, when executed by the actuator control system, cause a control function of the actuator control system to control an actuator to apply a torque on at least one wheel of the vehicle for reducing a difference between a first parameter value related to a current rotational speed of the wheel based on the current speed of the vehicle and a second parameter value related to a target rotational speed of the wheel, in association with a control bandwidth, the control bandwidth being determinable in dependence of the current operating condition of the vehicle; and
   controlling, by the actuator control system, the actuator using the control function.

9. The method of claim 8, further comprising:
determining a target speed of the vehicle based on the current operating condition, wherein the target rotational speed of the wheel is based on the target speed of the vehicle.

10. The method of claim 8, further comprising:
determining, based on the current operating condition, a desired operation performance of the vehicle, wherein the control bandwidth is further determinable in dependence of the desired operation performance of the vehicle.

11. The method of claim 8, further comprising:
determining a target bandwidth; and
transmitting the control signal comprising the determined target bandwidth, wherein the control bandwidth is further determinable in dependence of the target bandwidth.

12. The method of claim 8, wherein the current operating condition of the vehicle is based on at least one of a current vehicle condition and a current road condition at which the vehicle is operating.

13. The method of claim 8, wherein the current operating condition is at least one of a current vehicle mass, an inclination of the road at which the vehicle is operating, vehicle speed, a friction level between the wheel of the vehicle and a road surface, and a current tire stiffness.

14. An actuator control system of a vehicle, the actuator control system configured to:
determine a first parameter value related to a current rotational speed of the wheel;
configure a control function associated with a control bandwidth to control a torque applied to at least one wheel of a vehicle by an actuator to reduce a difference between the first parameter value and a second parameter value related to a target rotational speed of the at least one wheel;
obtain data indicative of a current operating condition of the vehicle;
set the control bandwidth of the control function in dependence of the current operating condition of the vehicle; and
control the actuator using the control function.

\* \* \* \* \*